(12) United States Patent
Stephens

(10) Patent No.: US 7,806,133 B1
(45) Date of Patent: Oct. 5, 2010

(54) FLUID LEVEL CONTROLLER

(75) Inventor: Amy C. Stephens, Houston, TX (US)

(73) Assignee: Delaware Capital Formation, Inc., Wilmington, DE (US)

( * ) Notice: Subject to any disclaimer, the term of this patent is extended or adjusted under 35 U.S.C. 154(b) by 889 days.

(21) Appl. No.: 11/495,973

(22) Filed: Jul. 27, 2006

(51) Int. Cl.
*F16K 31/18* (2006.01)

(52) U.S. Cl. .................... 137/15.26; 137/269; 137/270; 137/413

(58) Field of Classification Search ............ 137/1, 137/15.26, 85, 269, 270, 413–416, 445
See application file for complete search history.

(56) References Cited

U.S. PATENT DOCUMENTS

| | | | |
|---|---|---|---|
| 2,433,414 A * | 12/1947 | Annin | 137/270 |
| 2,529,254 A * | 11/1950 | Ives | 137/82 |
| 3,026,896 A * | 3/1962 | Bosworth et al. | 137/270 |
| 3,052,254 A | 9/1962 | Parks | |
| 3,120,241 A | 2/1964 | Parks | |
| 4,700,738 A * | 10/1987 | Frese et al. | 137/413 |
| 4,974,625 A | 12/1990 | Paullus et al. | |
| 5,191,912 A | 3/1993 | McDaniel | |
| 5,992,448 A | 11/1999 | Anderson et al. | |
| 6,220,566 B1 | 4/2001 | Miller | |
| 6,240,955 B1 | 6/2001 | Anderson et al. | |
| 6,354,323 B1 | 3/2002 | Anderson | |
| 6,497,246 B1 | 12/2002 | Nicewarner et al. | |
| 6,591,860 B1 | 7/2003 | Weber et al. | |
| 6,629,627 B1 | 10/2003 | Siegele et al. | |

* cited by examiner

*Primary Examiner*—John Rivell
*Assistant Examiner*—Craig Price
(74) *Attorney, Agent, or Firm*—Fellers, Snider, Blankenship, Bailey & Tippens

(57) ABSTRACT

A controller and method of using same are disclosed. Preferably, the controller includes a pilot cartridge housing supporting an invertible pilot cartridge assembly ("cartridge"). The cartridge preferably includes a cartridge body supporting a number of pneumatic seals adjacent the housing, wherein at least two of the seals are diaphragms. The cartridge preferably provides a first pilot activation feature and an opposing second pilot activation feature. The operating mode of the cartridge is determined by a selected orientation of the first pilot activation feature relative to the housing; and preferably the method of operating the controller includes the steps of: selecting an orientation of the first pilot activation feature relative to the housing; setting a span control mechanism to a neutral position relative to the housing; adjusting a float communicating with the cartridge to a neutral position; and adjusting said span control mechanism to determine a response type of said cartridge.

6 Claims, 5 Drawing Sheets

FLUID LEVEL CONTROLLER

FIELD OF THE INVENTION

This invention relates to new and useful improvements in fluid level controllers that incorporate pilot pressure control devices.

BACKGROUND

Controllers are known to utilize pressurized fluid to actuate a unit, such as a motor valve, to control a primary variable condition, such as a fluid level confined within a storage vessel, by maintaining the fluid level within the storage vessel within predetermined limits. Changes in the fluid level within the storage vessel are used by the controller to selectively apply the pressurized fluid to the unit, such as a motor valve controlling the flow of fluid through an inlet line attached to the storage vessel. Other applications and uses for pressurized fluid controllers are well known in the art.

One type of pressurized fluid control device is epitomized by the pressure control device disclosed within U.S. Pat. No. 3,102,241 issued to Asbury S. Parks on Feb. 4, 1964 (Parks '241). Although Parks '241 discloses a functional controller, controllers utilizing the technology disclosed by Parks '241 inherently present a number of drawbacks including: the encountering of significant downtime when defective diaphragms need replacement; and the need to reconfigure the pilot pressure control device, which interacts with the fluid level detection mechanism to control the fluid level within the vessel, and to change to operating mode of the controller from a direct mode to an indirect mode.

Accordingly, as market pressures continue to demand liquid level controllers that provide lower cost, greater reliability, and improved ease of use, challenges remain and a need persists for improvements in methods and apparatuses for use in fluid level monitoring and control devices.

SUMMARY OF THE INVENTION

In accordance with preferred embodiments, a controller includes at least a pilot cartridge housing ("cartridge housing") and an invertible pilot cartridge assembly ("cartridge") supported by the cartridge housing, in which the cartridge preferably includes a cartridge body supporting a plurality of seals, wherein the seals communicate with the cartridge housing to pneumatically isolate the cartridge form the cartridge housing, and at least two of the seals are diaphragms. The preferred embodiment further includes a base plate supporting the cartridge housing, a linkage shaft communicating with the base plate, and a level adjustment bar secured to the linkage shaft and configured with a transfer linkage configured for selective communication with either a first pilot activation feature provided on a proximal end of the cartridge, or a second pilot activation feature provided on a distal end of the cartridge. The operating mode of the cartridge is determined by an orientation of the first pilot activation feature relative to the housing, and preferably the cartridge responds to an activation of the level adjustment bar by generating a control signal.

In an alternate preferred embodiment, a method of operating the controller in a direct operating mode preferably includes the steps of: setting a span control mechanism provided by a first pilot activation feature of the cartridge to a neutral position relative to the cartridge housing supporting the cartridge; adjusting a float communicating with the cartridge to a neutral position relative to the cartridge housing; adjusting the span control mechanism to determine a signal response type of the cartridge; orienting the first pilot activation feature adjacent a detachable cover supported by the cartridge housing to determine a direct operating mode of the cartridge; and securing the detachable cover to the cartridge housing in preparation for operating the controller in the direct operating mode.

In an alternative preferred embodiment, a method of operating the controller in an indirect operating mode preferably includes the steps of: setting a span control mechanism provided by a first pilot activation feature of the cartridge to a neutral position relative to a cartridge housing supporting the cartridge; adjusting a float communicating with the cartridge to a neutral position relative to the cartridge housing; adjusting the span control mechanism to determine a signal response type of the cartridge; orienting a second pilot activation feature adjacent a detachable cover supported by the cartridge housing to determine an indirect operating mode of the cartridge; and securing the detachable cover to the cartridge housing in preparation for operating the controller in the indirect operating mode.

These and various other features and advantages that characterize the claimed invention will be apparent upon reading the following detailed description and upon review of the associated drawings.

DESCRIPTION OF THE PREFERRED EMBODIMENTS

Reference will now be made in detail to one or more examples of the invention depicted in the figures. Each example is provided by way of explanation of the invention, and not meant as a limitation of the invention. For example, features illustrated or described as part of one embodiment may be used with another embodiment to yield still a different embodiment. Other modifications and variations to the described embodiments are also contemplated within the scope and spirit of the invention.

Figure 1:
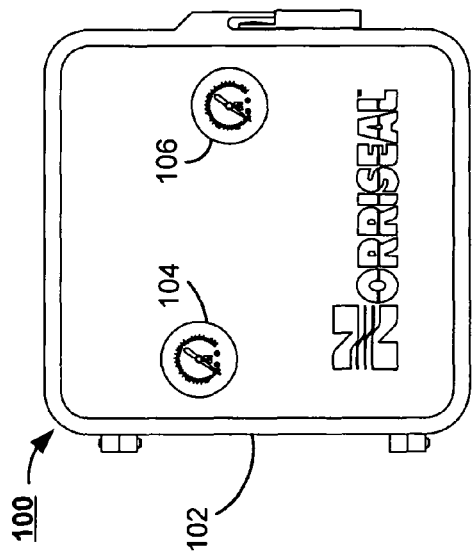
FIG. 1 shows a front elevational view of an embodiment of an inventive fluid level controller.

Referring to the drawings, FIG. 1 shows an inventive fluid level controller 100 (also referred to herein as controller 100) that includes a product cover 102 providing viewing apertures for visual access to both a fluid supply pressure gauge 104, and a fluid signal pressure gauge 106. The pressure gauges 104 and 106 provide operators of the controller 100 with the current status of the fluid associated with the controller 100.

Figure 2:
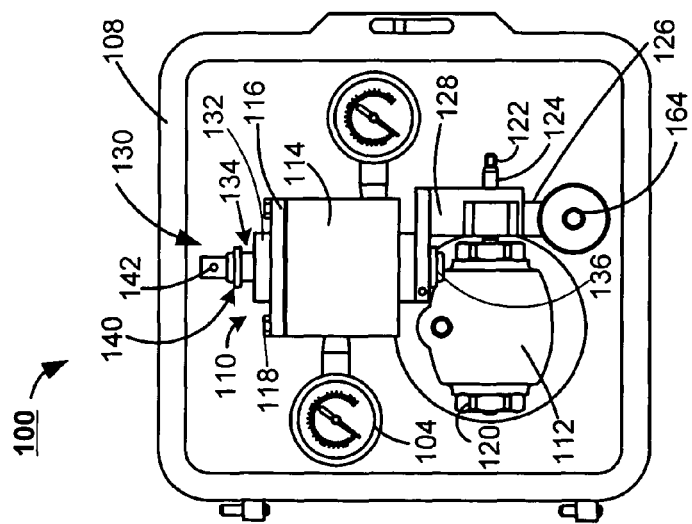
FIG. 2 shows a front elevational view of the controller of FIG. 1 with the cover removed.

FIG. 2 shows the controller 100 further includes a base plate 108, which supports a pilot cartridge housing assembly 110 (also referred to herein as cartridge housing 110) and a displacer housing 112. The cartridge housing 110 includes a main support structure 114, which provides access apertures for both the pressure gauges 104 and 106, and a mounting surface for a detachable cover 116. In a preferred embodiment the detachable cover 116 is secured to the main support structure 114 by at least one fastener 118.

The displacer housing 112 preferably supports at least one bearing block 120, which in turn preferably supports a linkage shaft 122. The linkage shaft 122 provides a mounting portion 124 for use in mounting a level adjustment bar 126, which communicates with a transfer linkage 128. During the discussion of FIG. 3, a response of the level adjustment bar 126 and transfer linkage 128 to a primary control input, such as the level of a fluid within a vessel, will be disclosed in greater detail.

FIG. 2 further shows the cartridge housing 110 confines an invertible pilot cartridge 130 (also referred to herein as cartridge 130). The cartridge 130 provides a first thrust pin 132, which includes with a first pilot activation feature 134; and a second thrust pin 136 (see FIG. 4), which includes a second pilot activation feature 138 (see FIG. 4). The structure of the first thrust pin 132 differs from the second thrust pin 136 in that the first thrust pin 132 preferably provides a threaded aperture provided for interaction with a span control adjustment mechanism 140. An important feature in a preferred embodiment of the span control adjustment mechanism 140 is an inclusion of an exhaust port 142.

The controller 100 illustrated in FIG. 2 shows the first thrust pin 132 is adjacent the detachable cover 116, and the transfer linkage 128 communicating with the second thrust pin 136. In this configuration, the cartridge 130 operates in a direct operating mode. As will be disclosed in greater detail during the discussion of FIGS. 4-9, the cartridge is designed to be symmetric about a fluid inlet access aperture 186 (see FIG. 5) of the cartridge housing 110. This symmetry of design facilitates mounting the second thrust pin of the cartridge 130 adjacent the detachable cover 116, and attaching the transfer linkage 128 to the first thrust pin 132 to operate the cartridge 130 in an indirect operating mode.

Figure 3:
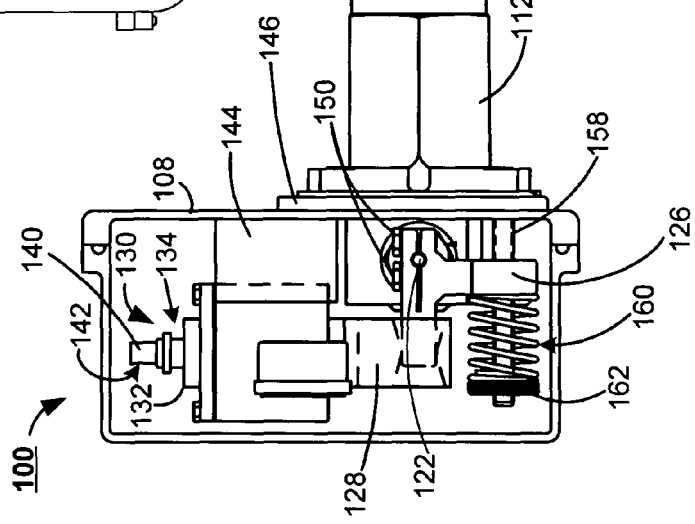
FIG. 3 shows a right side elevational view of the controller of FIG. 1 with the cover partially cutaway.

FIG. 3 shows the base plate 108 provides a mounting block 144 for attachment of the cartridge housing 110 to the base plate 108, the displacer housing 112 extends through the back of the base plate 108, and is secured to the base plate 108 by an attachment flange 146 provided by the base plate 108.

The displacer housing 112 provides access to the linkage shaft 122 for a displacer arm 148. The level adjustment bar 126 is secured to the linkage shaft 122 by fasteners 150. A distal end of the displacer arm 148 is attached to the linkage shaft 122 (not separately shown), and a proximal end 152 of the displacer arm 148 is secured to a swivel mechanism 154 that further connects with a displacer 156. In response to an interaction of the displacer 156 (also referred to herein as float 156) with a rising fluid level the float 156 rises, which causes the displacer arm 148 to rise thereby imparting counter clockwise rotation on the linkage shaft 122.

In response to be counter clockwise rotation of the linkage shaft 122, the level adjustment bar 126 rotates in a counter clockwise direction causing the transfer linkage 128 to impart a downward force on the second thrust pin 136. The downward force imparted on the second thrust pin 136 causes a generation of a control signal by the cartridge 130. As illustrated, the controller 100 is configured with the cartridge 130 positioned for operation in the direct acting mode. However, when configured for operation in the indirect operating mode, the cartridge 130 generates a control signal in response to a lowering of the float 156, typically caused by a lowering of a fluid interacting with the float 156.

FIG. 3 further shows the base plate 108 provides support for a threaded shaft 158, which accommodates the level adjustment bar 126, a counterbalance compression spring 160, and a counterbalance adjustment knob 162. The counterbalance adjustment knob 162 is preferably provided with a threaded aperture 164 (see FIG. 2), for interaction with the threaded shaft 158. A clockwise rotation of the counterbalance adjustment knob 162 causes a counter clockwise rotation of the linkage shaft 122, thereby raising the displacer 156. A counter clockwise rotation of the counterbalance adjustment knob 162 causes a clockwise rotation of the linkage shaft 122, thereby lowering the displacer 156. Having an advantage of being able to adjust the vertical position of the displacer 156 relative to the displacer housing 112, will become more clear during a disclosure of preferred embodiments of methods used for setting up the controller 100.

Figures 4, 5:
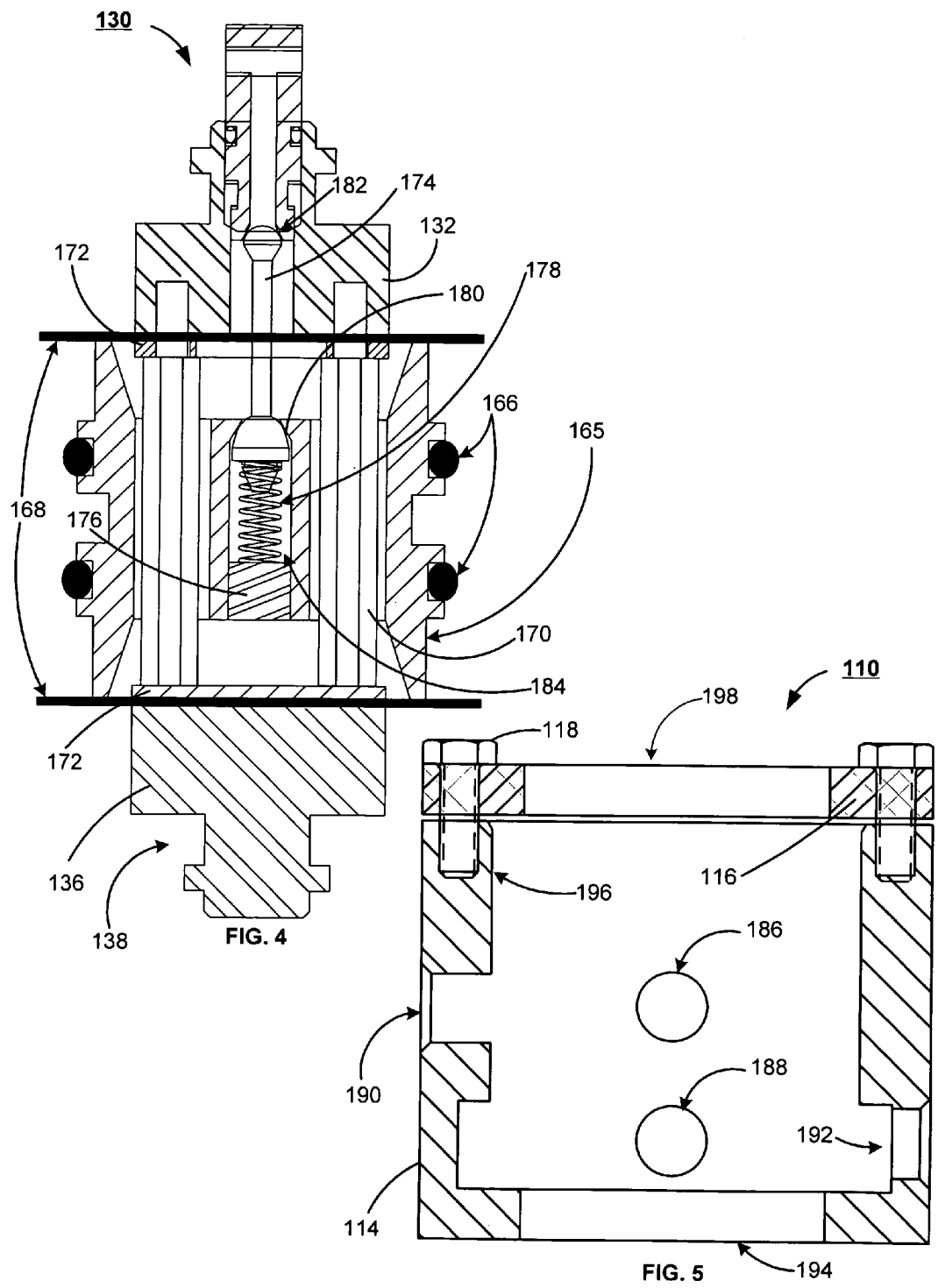
FIG. 4 shows a front elevational, cross-sectional view of an invertible pilot cartridge of the inventive liquid level controller of FIG. 2.
FIG. 5 shows a front elevational, cross-sectional view of a pilot cartridge housing assembly of the inventive liquid level controller of FIG. 2.
Figure 6:
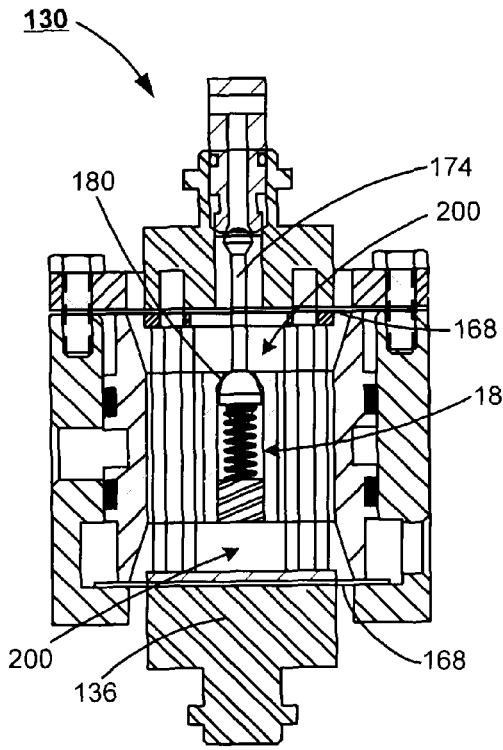
FIG. 6 illustrates a front elevational, cross-sectional view of the invertible pilot cartridge of the inventive liquid level controller of FIG. 2, configured in a direct operation mode.

In a preferred embodiment shown by FIG. 4, the invertible pilot cartridge 130 includes main cartridge body 165, which support a plurality of seals that include o-rings 166 and a pair of diaphragms 168. Preferably, a first of the pair of diaphragms 168 supports the first thrust pin 132, and the second of the pair of thrust pins 136. The first and second thrust pins 132, 136 are connected by spacers 170, which serve to transfer fluid between upper and lower portions of a signal chamber 200 (see FIG. 6). Preferably, a retention disc 172 is interposed between each of the pair of diaphragms 168 and each spacer 170. In a preferred operating mode, the thrust pins 132, 136 move in unison causing a change in position of the span control adjustment mechanism 140 relative to the main cartridge body 165, which controls the operation of a valve member 174 (also referred to herein as a peanut valve 174).

The main cartridge body 165 further provides a pilot spring retention member 176, which in a preferred embodiment is a set screw. The pilot spring retention member 176 provides support to and confinement of a pilot spring 178 that urges a bottom valve face of the peanut valve 174 against a first valve seat 180, provided by the main cartridge body 165. A top valve face of the peanut valve 174 communicates with a second valve seat 182, provided by the span control adjustment mechanism 140, to regulate passage of pressurized fluid through the exhaust port 142. Preferably, the pilot spring 178 is contained within a fluid input chamber 184 provided by the main cartridge body 165.

FIG. 5 shows the main support structure 114 of the cartridge housing 110 provides the fluid inlet access aperture 186, an output signal aperture 188, a fluid supply pressure gauge aperture 190, a fluid signal pressure gauge aperture 192, a first thrust pin access aperture 194, and a plurality of cover mounting apertures 196. The detachable cover 116 provides a second thrust pin access aperture 198.

When the controller 100 (of FIG. 3) is configured for operation in an indirect operating mode, the cartridge 130 (of FIG. 4) is mounted within the main support structure 114 of the cartridge housing 110 such that the first thrust pin 132 (of FIG. 4) protrudes through the first thrust pin access aperture 194. When the controller 100 is configured for operation in a direct operating mode, the cartridge 130 is mounted within the main support structure 114 of the cartridge housing 110 such that the second thrust pin 136 protrudes through the first thrust pin access aperture 194.

It will be noted that regardless of whether the controller 100 is configured for use in a direct operating mode or an indirect operating mode, the fluid input chamber 184 (of FIG. 4) (do to its central located within the main cartridge body 165 (of FIG. 4)) is consistently capable of being aligned for direct interaction and communication with the fluid inlet access aperture 186.

Figure 7:
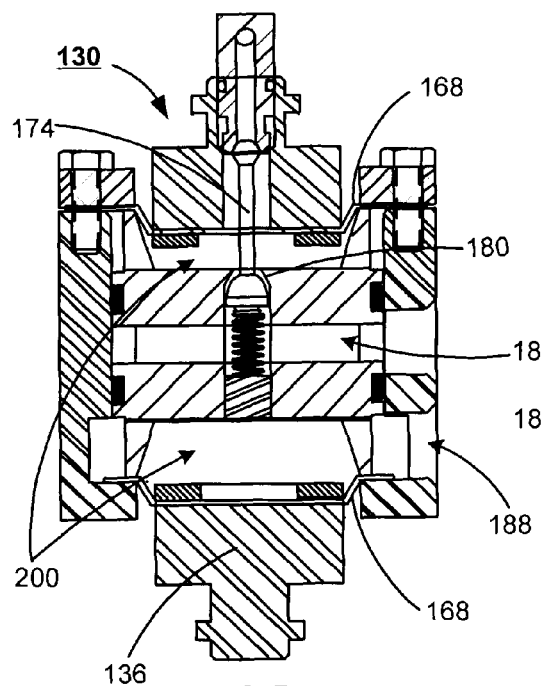
FIG. 7 illustrates a right side elevational, cross-sectional view of the invertible pilot cartridge of the inventive liquid level controller of FIG. 2, configured in a direct operation mode.

For an enhance understanding of the present invention, FIGS. 6, 7, 8, and 9 should be viewed in concert. In a preferred embodiment, the present invention is a liquid level controller, such as controller 100, which utilizes pressurized fluid, such as pressurized air, to operate a valve of a fluid storage vessel. When configured for operation in a direct operating mode, such as that shown by FIGS. 6 and 7, the controller is responsive to fluid within the fluid storage vessel reaching a maximum desired level. That is, when fluid in the storage vessel causes the float 156 (of FIG. 3) to rise, the float 156 applies a rotational force to the level adjustment bar 126 (of FIG. 3). The level adjustment bar 126 applies a downward force on the transfer linkage 128 (of FIG. 3), which pulls the cartridge 130 from a position shown by FIG. 6 to a position shown by FIG. 7 (of note is the deformation of the diaphragms 168). When the cartridge is positioned as shown by FIG. 7, the bottom valve face of the peanut valve 174 recedes from the first valve seat 180, which allows pressurized fluid to transfer from the fluid input chamber 184, to the signal chamber 200 and out the output signal aperture 188.

Figure 8:
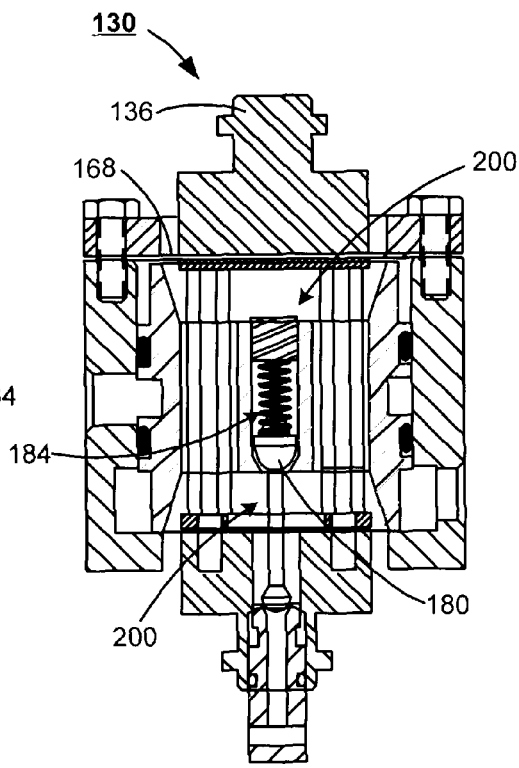
FIG. 8 illustrates a front elevational, cross-sectional view of the invertible pilot cartridge of the inventive liquid level controller of FIG. 2, configured in an indirect operation mode.
Figure 9:
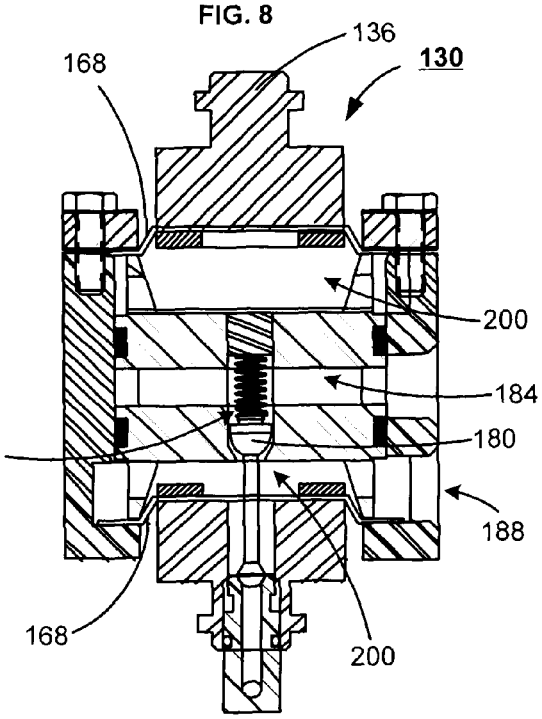
FIG. 9 illustrates a right side elevational, cross-sectional view of the invertible pilot cartridge of the inventive liquid level controller of FIG. 2, configured in an indirect operation mode.
Figure 10:
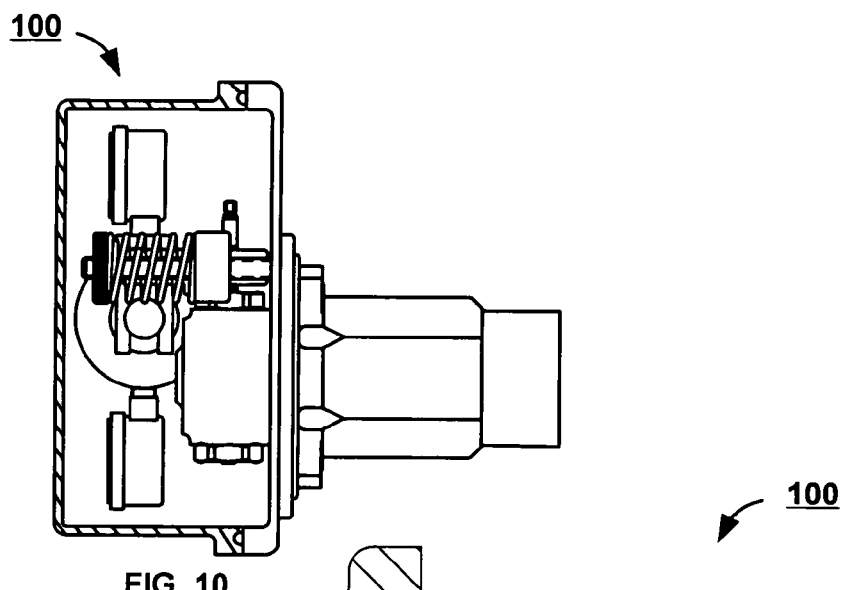
FIG. 10 reveals a partial cutaway, bottom plan view of the inventive liquid level controller of FIG. 3.

When the controller 100 is configured for operation in an indirect operating mode, such as that shown by FIGS. 8 and 9, the controller is responsive to fluid within the fluid storage vessel reaching a minimum desired level. That is, when fluid in the storage vessel causes the float 156 to fall, the float 156 applies a rotational force to the level adjustment bar 126. The level adjustment bar 126 applies an upward force on the transfer linkage 128, which pushes the cartridge 130 from a position shown by FIG. 8 to a position shown by FIG. 9 (of note is the deformation of the diaphragms 168). When the cartridge is positioned as shown by FIG. 9, the bottom valve face of the peanut valve 174 recedes from the first valve seat 180, which allows pressurized fluid to transfer from the fluid input chamber 184, to the signal chamber 200 and out the output signal aperture 188.

In both cases, the controller responds by transmitting a signal, preferably in the form of pressurized fluid, to the valve controlling the fluid level within the fluid storage vessel. When operating in the direct mode, the pressurized fluid operates to close the valve supplying fluid to the fluid storage vessel, when the volume of the fluid within the storage vessel has reached a predetermined maximum level. When operating in the indirect mode, the pressurized fluid operates to open the valve supplying fluid to the fluid storage vessel when the volume of the fluid within the storage vessel has reached a predetermined minimum level. However, those skilled in the art will appreciate that directing pressurized fluid to valve's controlling fluid levels within fluid storage vessels is not the only method of controlling valves associated with fluid storage vessels.

It is contemplated that the scope of the present invention includes the response of the controller to the fluid level condition within the fluid storage vessel to be the transmission of electrical signals for use in controlling valves, such as solenoid valves. Accordingly, the selection of a pneumatically based control environment has been made to facilitate an enhanced understanding of the present invention and does not import any limitations on the present invention.

In a preferred embodiment, the main cartridge body 165 of the invertible pilot cartridge 130, the span control adjustment mechanism 140, and the first and second thrust pins 132, 136 are formed from aluminum. However, one skilled in the art will recognize, alternate materials such as brass, ceramic, and ridged hard-wearing polymers are among those found suitable for the present invention.

Preferably, and independent from the choice of materials used, the distance between the first valve seat 180 and the second valve seat 182 can be changed by rotating the span control adjustment mechanism 140. Changing the distance between the first valve seat 180 and the second valve seat 182 changes the amount or span of movement of the float 156 (of FIG. 3) needed to supply a control signal. The direction of rotation of the span control adjustment mechanism 140 determines whether the control signal, provided by the controller 100, is a throttle type control signal, or a snap type control signal.

By turning the span control adjustment mechanism 140 to the right of a zero position, the cartridge operates in a throttle manner by providing a throttle type control signal, which allows for a more gradual change in the condition of the valve controlling the level of fluid within the storage vessel. By turning the span control adjustment mechanism 140 to the left of the zero position, the cartridge operates in a snap manner by providing a snap type control signal, which operates as an "on/off" signal. The further the span control adjustment mechanism 140 is positioned from the zero position, the larger the resulting span.

Figure 11:
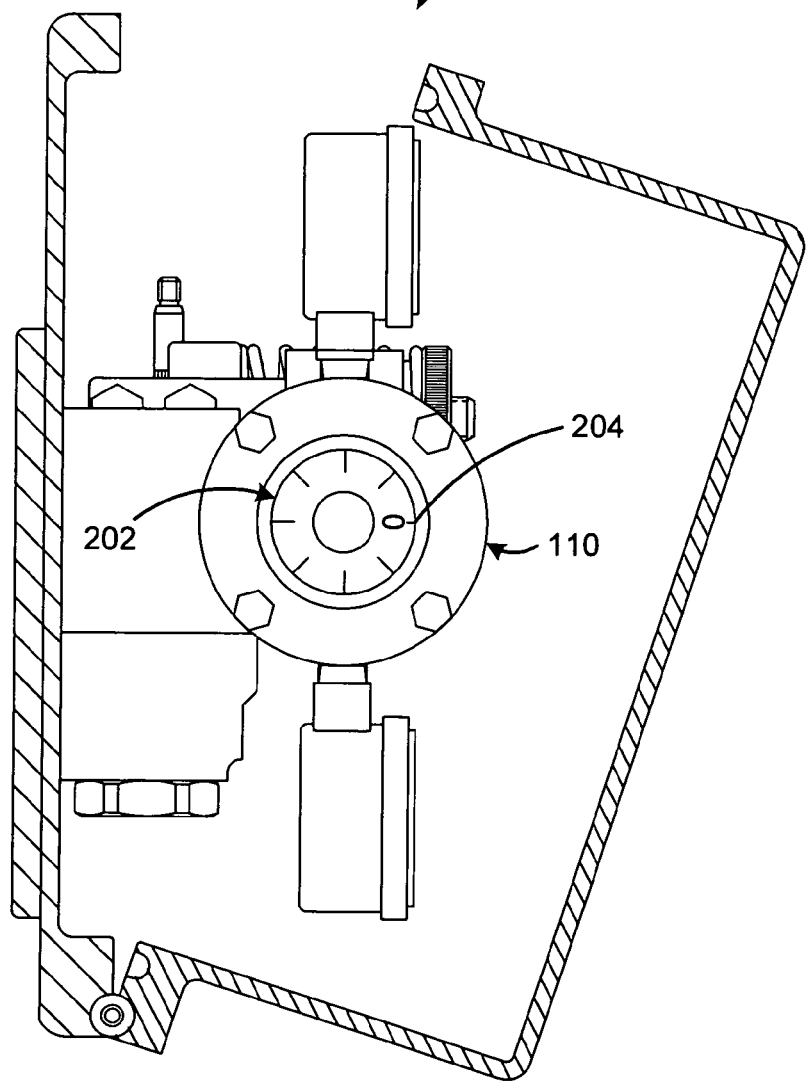
FIG. 11 reveals a partial cutaway, top plan view of the inventive liquid level controller of FIG. 1.

In a preferred embodiment, the controller 100 is calibrated for operation through use of the following procedure:

1) Turn the span control adjustment mechanism 140 to a predetermined position mark 202 (see FIG. 11), located on a top surface of the first thrust pin 132, to set the span.
2) Adjust the liquid level within the storage vessel to the desired bottom switch point.
3) Increase the spring force by turning the counterbalance adjustment knob 162 (of FIG. 2) clockwise until an output signal is provided by the controller 100.
4) Decrease the spring force by turning the counterbalance adjustment knob 162 counter clockwise until the controller 100 halts the output signal.
5) The controller 100 is now calibrated to switch off at a bottom switch point and back on at a predetermined distance up from the bottom set-point. This predetermined distance is determined by the position of the span control adjustment mechanism 140.

In an alternate preferred embodiment, the controller 100 is calibrated for operation through use of the following procedure:

1) Turn the span control adjustment mechanism 140 to a predetermined position mark 202, located on a top surface of the first thrust pin 132, to set the span.
2) Adjust the liquid level in the storage vessel to the desired top switch point.
3) Increase the spring force by turning the counterbalance adjustment knob 162 clockwise until an output signal is provided by the controller 100.
4) The controller 100 is now calibrated to switch on at the top switch point and off at a predetermined distance from the top set-point. This predetermined distance is determined by the position of the span control adjustment mechanism 140.

In an alternative preferred embodiment, the controller 100 is calibrated for operation through use of the following procedure:

1) Turn the span control adjustment mechanism 140 to a zero point 204 (see FIG. 11), located on a top surface of the first thrust pin 132.
2) Adjust the liquid level of the storage vessel to the desired top switch point.
3) Increase the spring force by turning the counterbalance adjustment knob 162 clockwise until an output signal is provided by the controller 100.
4) Lower the level of the liquid in the storage vessel to the desired bottom level, which will cause the float 156 to be lowered, which thereby stops the output signal.
5) Turn the span control adjustment mechanism 140 away from the zero point 204 until the output signal is once again provided by the controller 100.
6) Turn the adjustment knob towards the zero point until the output signal goes to zero.

Figure 12:
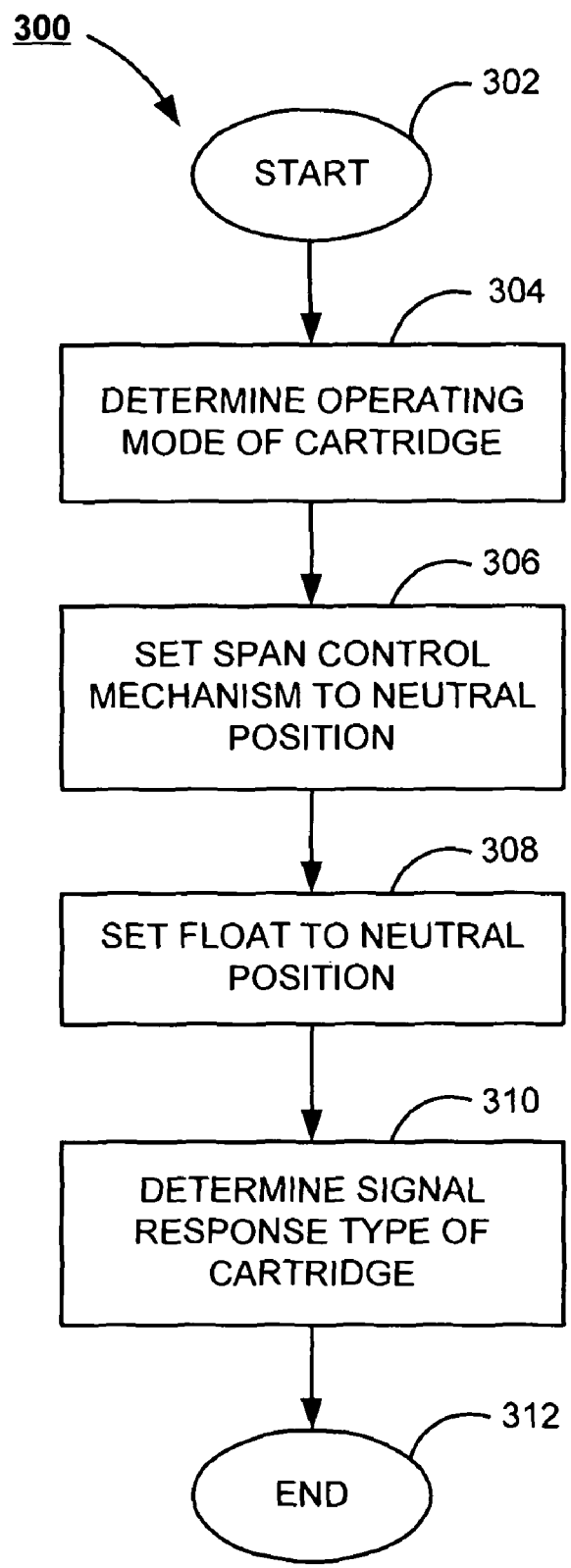
FIG. 12 shows a method of using the inventive liquid level controller of FIG. 1.

Turning to FIG. 12, shown therein is a flow chart 300, which depicts a method of operating a liquid level controller (such as 100). The method commences at start process step 302 and proceeds to process step 304 with a determination of an operating mode of an invertible pilot cartridge (such as 130) based on an orientation of the cartridge relative to a cartridge housing (such as 110). At process step 306, a span control mechanism (such as 140) is set to a neutral position (such as 204) relative to the cartridge housing. At process step 308, a float (such as 156) communicating with the cartridge and a fluid in a storage vessel is set to a neutral position relative to the cartridge housing. At process step 310, the span control mechanism is adjusted to determine a signal response type of the cartridge, and the process concludes at end process step 312.

In a preferred embodiment, the cartridge provides a first pilot activation feature (such as 134) of a first thrust pin (such as 132) that supports the span control mechanism, the cartridge housing includes a detachable cover (such as 116), and process step 304 includes at least a step of: orienting the first pilot activation feature adjacent the detachable cover to determine a direct operating mode of the cartridge; and securing the detachable cover to the cartridge housing in preparation for operating the controller in a direct operating mode.

In an alternate preferred embodiment, the cartridge provides the first pilot activation feature of the first thrust pin, which supports the span control mechanism, the cartridge housing includes the detachable cover, and process step 304 includes at least a step of: orienting said second pilot activation feature adjacent said detachable cover to determine an indirect operating mode of said cartridge; and securing said detachable cover to said cartridge housing in preparation for operating said liquid level controller in said indirect operating mode.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed by the appended claims.

What is claimed is:

1. A method of operating a liquid level controller by steps comprising:

determining an operating mode of an invertible pilot cartridge based on an orientation of said cartridge relative to a cartridge housing, in which said cartridge is separate and distinct from and secured within said housing, and wherein said operating mode is selected from a group consisting of a direct operating mode and an indirect operating mode;

setting a span control mechanism to a neutral position relative to said cartridge housing, said span control mechanism secured to a proximal end of said cartridge and extending beyond the confines of said housing;

adjusting a float communicating with said cartridge to a neutral position relative to said cartridge housing; and adjusting said span control mechanism to determine an amount of movement needed by said float to supply a control signal, wherein said control signal is a direct control signal when said cartridge is secured for operation within said housing and said span control mechanism secured to said cartridge extends beyond the confines of said housing in a first direction, and further wherein said control signal is an indirect control signal when said cartridge is inverted and secured for operation within said housing such that said span control mechanism extends beyond the confines of said housing in a second and opposite direction from said first direction.

2. The method of claim 1, in which said cartridge comprises a first pilot activation feature supporting said span control mechanism, said cartridge housing comprising a single detachable cover, and by further steps comprising:

orienting said first pilot activation feature adjacent said single detachable cover to determine the operating mode of said cartridge to be in said direct operating mode; and securing said detachable cover to said cartridge housing in preparation for operating said liquid level controller in said direct operating mode.

3. The method of claim 1, in which said cartridge comprises a second pilot activation feature distal from said span control mechanism, said cartridge housing comprising a single detachable cover, and by steps further comprising:

orienting said second pilot activation feature adjacent said single detachable cover to determine the operating mode of said cartridge to be in said indirect operating mode; and securing said detachable cover to said cartridge housing in preparation for operating said liquid level controller in said indirect operating mode.

4. The method of claim 1, by a further step comprising, rotating said span control mechanism in a counter clockwise direction relative to said neutral position to place said cartridge into a snap signal response type.

5. The method of claim 1, by a further step comprising, rotating said span control mechanism in a clockwise direction relative to said neutral position to place said cartridge into a throttle signal response type.

6. The method of claim 1, in which the step of adjusting said float relative to said cartridge housing comprises, rotating an adjustment nut to alter a position of said float relative to said cartridge housing such that in response to said float being acted upon by a fluid, said cartridge provides a control signal.

* * * * *